United States Patent
Hayashi et al.

(10) Patent No.: US 9,030,156 B2
(45) Date of Patent: May 12, 2015

(54) POWER SUPPLY SYSTEM USING AN ASSEMBLED BATTERY

(75) Inventors: Kensuke Hayashi, Tokyo (JP); Keiichi Enoki, Tokyo (JP); Shingo Yamaguchi, Tokyo (JP); Yoshimasa Nishijima, Tokyo (JP); Yuji Zushi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 401 days.

(21) Appl. No.: 13/614,517

(22) Filed: Sep. 13, 2012

(65) Prior Publication Data

US 2013/0271082 A1 Oct. 17, 2013

(30) Foreign Application Priority Data

Apr. 13, 2012 (JP) ................. 2012-092149

(51) Int. Cl.
| | |
|---|---|
| *H02J 7/00* | (2006.01) |
| *H01M 10/48* | (2006.01) |
| *H01M 10/42* | (2006.01) |
| *B60L 11/18* | (2006.01) |

(52) U.S. Cl.
CPC ............ *H01M 10/48* (2013.01); *H01M 10/425* (2013.01); *H01M 2010/4271* (2013.01); *B60L 11/1866* (2013.01); *H02J 7/0018* (2013.01); *B60L 11/1861* (2013.01); *B60L 2210/10* (2013.01); *B60L 2240/547* (2013.01); *B60L 2240/549* (2013.01); *Y02T 10/7044* (2013.01); *Y02T 10/7005* (2013.01); *Y02T 10/7061* (2013.01); *Y02T 10/7216* (2013.01); *Y02T 10/7055* (2013.01)

(58) Field of Classification Search
CPC .................................................... H02J 7/0014

USPC .................... 320/107–109, 118, 137–140
See application file for complete search history.

(56) References Cited

U.S. PATENT DOCUMENTS

2013/0049698 A1* 2/2013 Jung ............................ 320/134

FOREIGN PATENT DOCUMENTS

| JP | 07-322491 A | 12/1995 |
|---|---|---|
| JP | 2008-92660 A | 4/2008 |
| JP | 2009-247145 A | 10/2009 |
| JP | 2011-018537 A | 1/2011 |

OTHER PUBLICATIONS

Japanese Office Action (Preliminary Notice of Reasons for Rejection) dated Sep. 10, 2013, Patent Application No. 2012-092149.

* cited by examiner

*Primary Examiner* — Paul Dinh
(74) *Attorney, Agent, or Firm* — Sughrue Mion, PLLC

(57) ABSTRACT

In a power supply system provided with an assembled battery supervisory device which supervises an assembled battery composed of storage elements connected in series with one another, the system using the assembled battery is obtained which makes it possible to supply electric power to the assembled battery supervisory device, with a simple arrangement. The arrangement is such that electric power for the assembled battery supervisory device is obtained from a part of storage elements constituting the assembled battery. The cell balancer is driven based on the average consumption electric current of the assembled battery supervisory device so as to suppress a deviation in the amount of charge between those storage elements which supply electric power to the assembled battery supervisory device, and those storage elements which do not supply electric power to the assembled battery supervisory device, resulting from the average consumption electric current of the assembled battery supervisory device.

5 Claims, 11 Drawing Sheets

POWER SUPPLY SYSTEM USING AN ASSEMBLED BATTERY

BACKGROUND OF THE INVENTION

1. Field of the invention

The present invention relates to a power supply system using an assembled battery in which storage elements are combined in series with one another, and in particular to a technique in which electric power is supplied to an assembled battery, supervisory device which watches or supervises an assembled battery, with a simple structure or arrangement.

2. Description of the Related Art

In the past, there have been developed techniques with respect to an assembled battery, which can increase an amount of electric energy able to be stored or charged, and at the same time reduce the loss at the time of charging and discharging, by combining storage elements in series with one another. Such an assembled battery is provided with an assembled battery supervisory device for the purpose of supervising the states of charge of the storage elements which constitute the assembled battery.

In a power supply system using such a kind of assembled battery, in cases where the electric power required for the operation of the assembled battery supervisory device is obtained from the assembled battery, the voltage of the assembled battery is generally different from an operating voltage required by the assembled battery supervisory device, and so stable electric power is supplied to the assembled battery supervisory device through the use of a regulator (voltage conversion circuit).

For example, as a conventional power supply system for use with a vehicle, there has been known a technique in which large electric power can be supplied to the vehicle by connecting a plurality of storage elements in series with one another (for example, refer to an under-mentioned first patent document).

In the invention disclosed in the first patent document, in order to eliminate variation in voltage of the individual storage elements occurring due to the individual variation of the storage elements at the time when the storage elements are connected in series with one another thereby to supply electric power to the vehicle, a balance circuit (cell balancer) is attached to the storage elements, and is driven to operate in an intermittent manner during the stop of the vehicle, so that the voltage balance of the storage elements is made constant.

FIG. 9 is a block diagram showing a conventional power supply system using an assembled battery disclosed in the first patent document, wherein there is shown an arrangement in which a power supply for a assembled battery supervisory device 2 is obtained from an assembled battery 1.

In FIG. 9, the conventional system is provided with the assembled battery 1 that is composed of storage elements connected in series with one another, the assembled battery supervisory device 2 that serves to supervise or monitor the assembled battery 1 and to balance (equalize) the voltages of the storage elements, an electricity storage unit 101 that is composed of a vehicle mounted battery, an alternator 102 and a DC-DC converter 103 that are connected to the assembled battery 1 and the assembled battery supervisory device 2, and an electric load 104 that is connected to the electricity storage unit 101 and the DC-DC converter 103.

The assembled battery supervisory device 2 is provided with a voltage conversion circuit 21 that stabilizes the voltage from the assembled battery 1 to a desired voltage, a cell balancer 23 that balances or equalizes the voltages of the storage elements of the assembled battery 1, an insulating communication circuit 30 for communicating with external vehicle mounted equipment (not shown), and an internal arithmetic device 22 that calculates an amount of drive of the cell balancer 23 and at the same time provides a communication instruction to the insulating communication circuit 30.

The assembled battery 1 is supplied with electric power from the alternator 102, and the DC-DC converter 103 converts the electric power from the assembled battery 1, and supplies the electric power thus converted to the electric load 104 and the electricity storage unit 101.

In the case of the conventional system (FIG. 9) disclosed in the first patent document, when the number of the storage elements which are connected in series with one another in the assembled battery 1 increases, an input voltage to the voltage conversion circuit 21 in the assembled battery supervisory device 2 becomes a higher voltage, and hence, it will be necessary to use elements with high operation guarantee voltage as the voltage conversion circuit 21, thus giving rise to an enlargement and a cost rise of the structure or arrangement.

In addition, as another conventional system, there has been known an arrangement in which electric power for an assembled battery supervisory device 2 is obtained from an electricity storage unit 101, as shown in FIG. 10.

In FIG. 10, the assembled battery supervisory device 2 is provided, in place of the above-mentioned voltage conversion circuit 21 (refer to FIG. 8), with an insulating voltage conversion circuit 20 for electrically insulating a high voltage system and a low voltage system from each other for the purpose of preventing electric leakage.

The insulating voltage conversion circuit 20 converts the electric power supplied from the electricity storage unit 101 by means of an isolation transformer, and supplies the electric power thus converted to an internal arithmetic device 22 and an insulating communication circuit 30.

In the case of the conventional system shown in FIG. 10, the insulating voltage conversion circuit 20 is required, which has become a cause for the enlargement and the cost rise of the arrangement or structure.

As another conventional system, there has also been proposed a technique in which in an electricity storage module that is composed of storage elements connected in series with one another, it is made possible to supply electric power to electrical and electronic equipments or the like which are different in operating voltage from one another, by supplying electric power from a center tap of an electricity storage module to the electrical and electronic equipments or the like, without using a DC-DC converter (for example, refer to an under-mentioned second patent document).

In the conventional system disclosed in the second patent document, it is constructed such that the electric power for the electrical and electronic equipments is obtained from the center tap of the assembled battery in which the storage elements are connected in series with one another, and a balance circuit is driven so as to make the voltages of the storage elements, which constitute the assembled battery, equal to one another.

In the case of the conventional system disclosed in the second patent document, the voltages of the storage elements are made equal during the use or operation of the assembled battery, but in cases where there is variation in the internal resistances of the individual storage elements which constitute the assembled battery in the course of using the assembled battery, there will also be variation in the terminal voltages of the storage elements resulting from the difference of the internal resistances thereof. As a result, there will be a possibility that the states of charge of the storage elements may not be able to be made equal to one another in a correct manner.

Then, in cases where the states of charge of the storage elements can not be made equal to one another, it is necessary to continue the driving of the assembled battery supervisory device in order to equalize the difference of the states of charge of the storage elements after the use or operation of the assembled battery is terminated, so that the electric power consumption will be increased after the termination of the use or operation of the assembled battery.

As a result, in cases where this conventional system has been applied as a power supply system for a vehicle, there has been a possibility that the electric power consumption after the stop of the vehicle may be increased.

PRIOR ART REFERENCES

Patent Documents

First Patent Document: Japanese patent application laid-open No. 2008-92660
Second Patent Document: Japanese patent application laid-open No. 2009-247145

SUMMARY OF THE INVENTION

With the conventional power supply systems each using an assembled battery, for example, in the arrangement in which electric power is supplied to the assembled battery supervisory device 2 from the assembled battery 1, as shown in the first patent document (FIG. 9), when the number of the storage elements in the assembled battery 1 becomes large, the input voltage to the voltage conversion circuit 21 becomes higher, and hence, it is necessary to use elements with high operation guarantee voltage, thus giving rise to a problem that the enlargement and the cost rise of the arrangement are caused.

In addition, as shown in the another arrangement example (FIG. 10), in cases where electric power is supplied from the electricity storage unit 101 to the assembled battery supervisory device 2, it becomes necessary to use the insulating voltage conversion circuit 20, and in this case, too, there has been a problem that the enlargement and the cost rise of the arrangement are caused.

Moreover, for example, as shown in the second patent document, in cases where the electric power for the electrical and electronic equipments is obtained from the center tap of the assembled battery, there will be a possibility that during the use of the assembled battery, the states of charge of the storage elements may not be able to be made equal to one another resulting from variation in the individual storage elements. For this reason, it is necessary to continue the driving of the assembled battery supervisory device after the termination of the use of the assembled battery, and hence, the electric power consumption is increased after the termination of the use of the assembled battery. As a result, in particular, in cases where this conventional system has been applied as a power supply system for a vehicle, there has been a problem that the electric power consumption after the stop of the vehicle is increased.

The present invention has been made in order to solve the problems as referred to above, and has for its object to obtain a power supply system which is capable of suppressing a decrease in the usable capacity of the assembled battery resulting from a difference in the states of charge of the storage elements constituting the assembled battery, as well as achieving an extension of the life span of the assembled battery, by simplifying an arrangement for supplying electric power to an assembled battery supervisory device and at the same time equalizing a difference in the amounts of electric currents consumed by the storage elements constituting the assembled battery in an appropriate manner.

A power supply system using an assembled battery according to the present invention includes an assembled battery that is composed of a plurality of storage elements combined in series with one another, and an assembled battery supervisory device that supervises a state of charge of the assembled battery, wherein the assembled battery supervisory device is provided with: a voltage conversion circuit that requires an operating voltage lower than a voltage of the assembled battery, and is supplied with electric power from a part of the assembled battery; a cell balancer that equalizes the states of charge of the plurality of storage elements; and an internal arithmetic device that is supplied with electric power from the voltage conversion circuit, and drives the cell balancer in accordance with an average consumption electric current of the assembled battery supervisory device.

According to the present invention, the states of charge of the plurality of storage elements in the assembled battery can be made equal to one another in a reliable manner by means of the internal arithmetic device and the cell balancer. In addition, electric power is supplied to the assembled battery supervisory device from a part of the assembled battery, so that even in cases where the number of storage elements in the assembled battery increases to raise a total voltage of the assembled battery, there is no need to use elements with high operation guarantee voltage as the voltage conversion circuit which serves to supply electric power into the assembled battery supervisory device, thus making it possible to suppress the enlargement and the cost rise of the system arrangement.

The above and other objects, features and advantages of the present invention will become more readily apparent to those skilled in the art from the following detailed description of preferred embodiments of the present invention taken in conjunction with the accompanying drawings.

BEST MODES FOR CARRYING OUT THE INVENTION

First Embodiment

Figure 1:
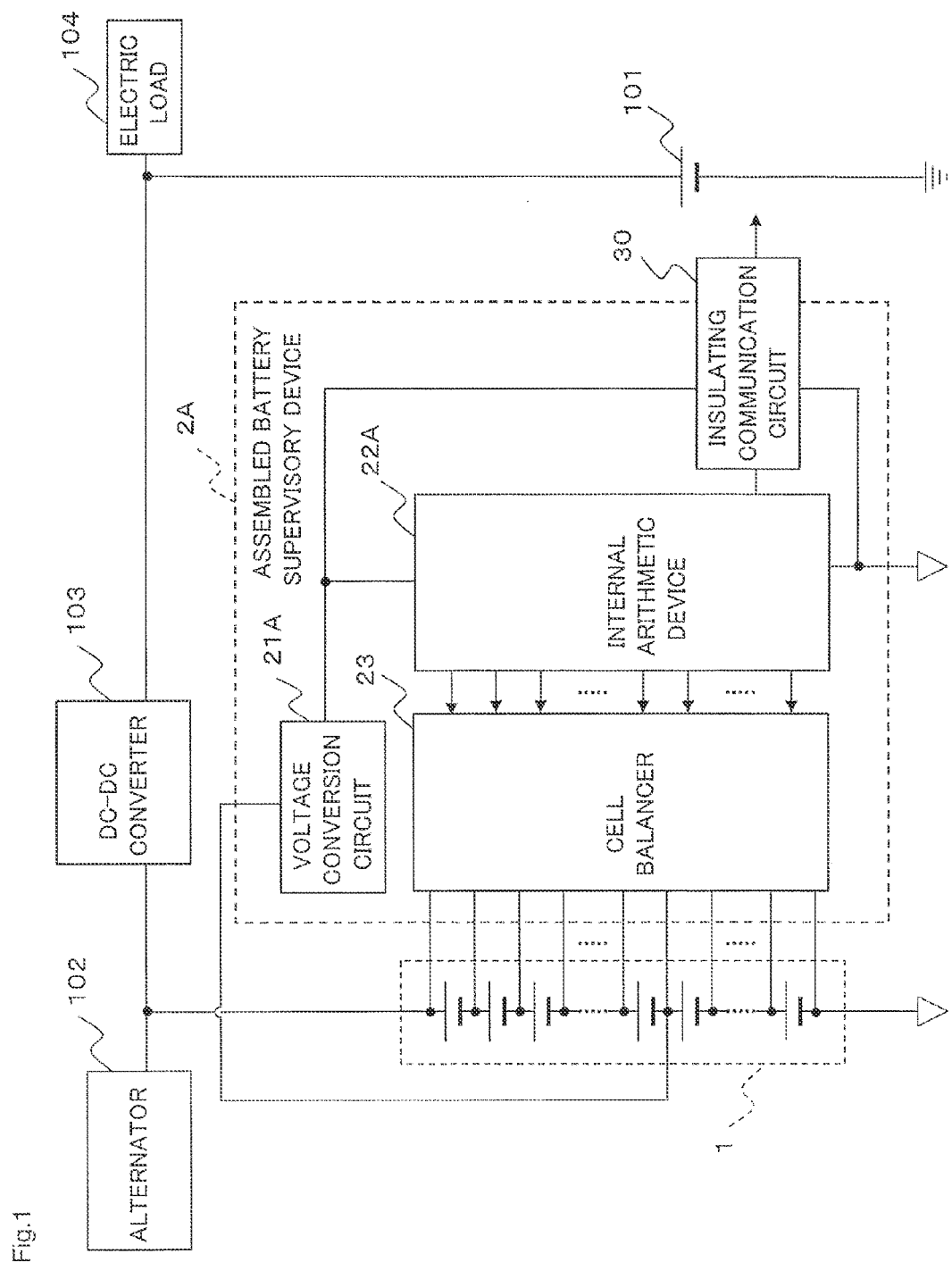
FIG. 1 is a block diagram of a power supply system using an assembled battery according to a first embodiment of the present invention.

FIG. 1 is a block diagram showing a schematic arrangement of a first embodiment of the present invention, wherein there is shown a case in which the invention is applied to a power supply system for a vehicle.

In FIG. 1, the power supply system using an assembled battery according to the first embodiment of the present invention is provided with an assembled battery 1 that is composed of storage elements connected in series with one another, an assembled battery supervisory device 2A that serves to supervise or monitor the assembled battery 1 and to balance or equalize the voltages of the storage elements, an electricity storage unit 101 that is composed of a vehicle mounted battery, an alternator 102 and a DC-DC converter 103 that are connected to the assembled battery 1 and the assembled battery supervisory device 2A, and an electric load 104 that is connected to the electricity storage unit 101 and the DC-DC converter 103.

The assembled battery supervisory device 2A is provided with a voltage conversion circuit 21A, an internal arithmetic device 22A, a cell balancer 23, and an insulating communication circuit 30, wherein electric power is supplied to the assembled battery supervisory device 2A from a part of the assembled battery 1.

The voltage conversion circuit 21A serves to stabilize a voltage from the part of the assembled battery 1 to a required voltage (e.g., 5 V), thereby to supply electric power to the internal arithmetic device 22A and the insulating communication circuit 30.

The internal arithmetic device 22A calculates amounts of driving of the cell balancer 23 according to an average consumption electric current (to be describes later) of the assembled battery supervisory device 2A, and at the same time, provides a communication instruction to the insulating communication circuit 30, so that it carries out communications with various kinds of vehicle mounted external units (not shown) through the insulating communication circuit 30.

The cell balancer 23 includes a plurality of resistance elements and switching elements (not shown), and serves to set an amount of driving (a ratio of driving and non-driving) and a voltage of each switching element under the control of the internal arithmetic device 22A, whereby the amounts of charge and the voltages of the individual storage elements in the assembled battery 1 are made equal to one another according to the amount of driving thus set.

The insulating communication circuit 30 includes a photo coupler (not shown), and carries out communications between the internal arithmetic device 22A and other vehicle mounted external units which are different therefrom in reference potential.

In cases where the power supply system of FIG. 1 is adapted to the vehicle, the alternator 102 supplies electric power to the assembled battery 1 and the DC-DC converter 103, and the DC-DC converter 103 converts the electric power supplied from the assembled battery 1 and the alternator 102, and supplies the electric power thus converted to the electric load 104 and the electricity storage unit 101. The electricity storage unit 101 stores the electric power supplied from the DC-DC converter 103, and at the same time supplies the electric power to the electric load 104.

Here, note that the electricity storage unit 101 through the electric load 104 are one example of an arrangement in cases where the power supply system is adapted to the vehicle, but they are not indispensable arrangement components in the first embodiment of the present invention.

Next, reference will be made to a processing function of the internal calculation device 22A which is a characteristic requirement of the first embodiment of the present invention, while referring to FIG. 2 and FIG. 3.

Figure 11:
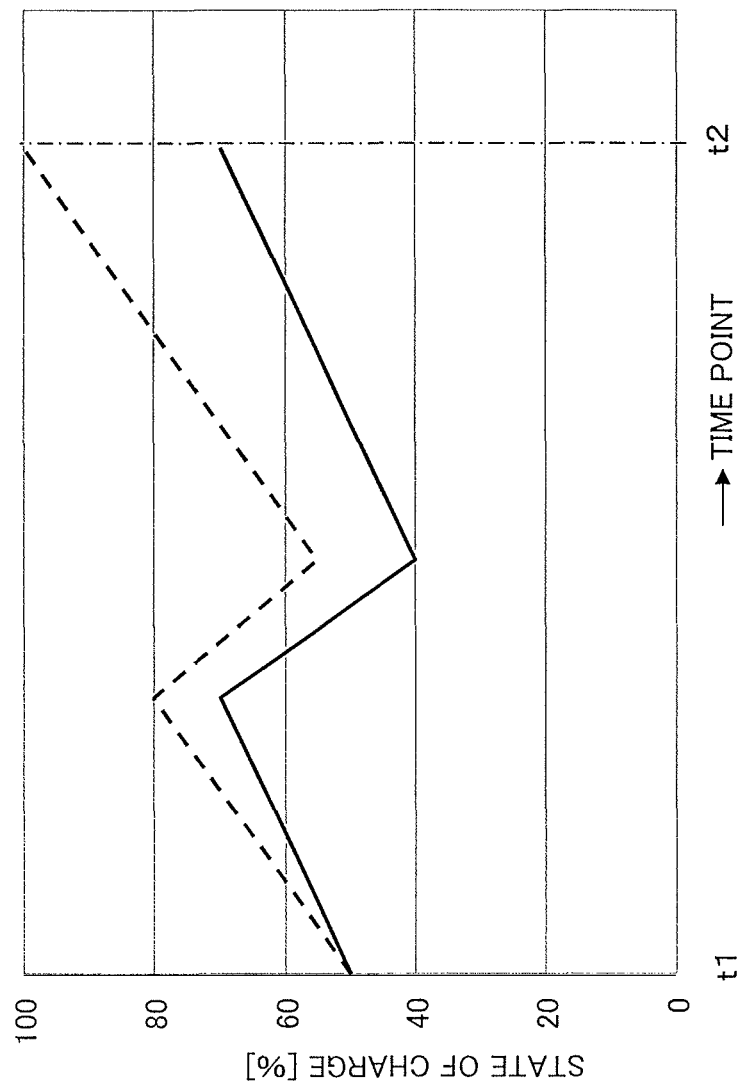
FIG. 11 is an explanatory view showing the temporal changes of the state of charge of each storage element in the power supply arrangement of FIG. 1 in cases where equalization processing has not been applied to the storage elements in the assembled battery.

For example, in an arrangement in which electric power for the assembled battery supervisory device 2A is obtained from a part of the assembled battery 1, in cases where equalization processing of the storage elements in the assembled battery 1 is not applied in the course of the use of the assembled battery 1, the state of charge of each storage element will change, as shown in FIG. 11.

FIG. 11 is an explanatory view showing the temporal changes of the states of charge of each storage element in cases where equalization processing has not been applied to the storage elements in the course of the use of the assembled battery 1, wherein the axis of abscissa represents time point t, and the axis of ordinate represents the state of charge [%].

In FIG. 11, a solid line indicates the change of the state of charge of each storage element in the assembled battery 1 which supplies electric power to the assembled battery supervisory device 2A, and a broken line indicates the state of charge of each storage element in the assembled battery 1 which does not supply electric power to the assembled battery supervisory device 2A.

A time point t1 indicates an operation start point in time of the power supply system using the assembled battery 1, and hereafter, over a period of time until a time point t2, the state of charge of the assembled battery 1 changes while increasing and decreasing with its charging and discharging operations according to a power generation state and a loaded condition thereof.

At this time, a storage element (solid line) which supplies electric power to the assembled battery supervisory device 2A has a large amount of electric current consumed as compared with a storage element which does not supply electric power to the assembled battery supervisory device 2A, so that a deviation occurs gradually between the states of charge of both, and at a time point t2, the state of charge of the storage element (broken line), which does not supply electric power to the assembled battery supervisory device 2A, will reach an upper limit value (100%).

As a result, those storage elements which supply electric power to the assembled battery supervisory device 2A become unable to be charged to more than an upper limit value, so that the capacity to which the assembled battery 1 can be charged and discharged (hereinafter referred to as the chargeable and dischargeable capacity) decreases.

That is, the chargeable and dischargeable capacity of the assembled battery 1 decreases by an amount of the difference between the states of charge of those storage elements which do not supply electric power to the assembled battery supervisory device 2A, and the states of charge of those storage elements which supply electric power to the assembled battery supervisory device 2A.

In addition, when the assembled battery 1 is going to be charged further from the time point t2, the states of charge of those storage elements which do not supply electric power to the assembled battery supervisory device 2A will exceed the upper limit value (100%), and hence, faults such as life degradation, firing, etc., may occur.

Thus, it can be understood that in the assembled battery 1, when a difference in the states of charge among the storage elements constituting the assembled battery 1 occurs due to a difference in the consumed electric current between the states of charge of those storage elements which supply electric power to the assembled battery supervisory device 2A and those storage elements which do not supply electric power to the assembled battery supervisory device 2A, the chargeable and dischargeable capacity of the assembled battery 1 decreases and at the same time a deterioration of the storage elements is caused.

Accordingly, the internal arithmetic device 22A of the assembled battery supervisory device 2A according to the first embodiment of the present invention drives the cell balancer 23 based on the average consumption electric current of the assembled battery supervisory device 2A in such a manner as to equalize the difference between the states of charge of those storage elements which do not supply electric power to the assembled battery supervisory device 2A, and the states of charge of those storage elements which supply electric power to the assembled battery supervisory device 2A.

That is, the internal arithmetic device 22A is constructed so as to suppress the deviation in the states of charge in the assembled battery 1 resulting from the supply of electric power to the assembled battery supervisory device 2A, by equalizing the states of charge of those storage elements which do not supply electric power to the assembled battery supervisory device 2A, and the states of charge of those storage elements which supply electric power to the assembled battery supervisory device 2A.

Specifically, the internal arithmetic device 22A increases the amounts of driving of the cell balancer 23 with respect to those storage elements which do not supply electric power to the assembled battery supervisory device 2A, respectively.

Hereinafter, as one example, it is constructed such that m storage elements from a high voltage side (alternator 102 side) of the assembled battery 1 among a total of (m+n) storage elements in the assembled battery 1 do not supply electric power to the assembled battery supervisory device 2A, whereas n storage elements from a low voltage side (ground side) of the assembled battery 1 supply electric power to the assembled battery supervisory device 2A.

At this time, the number n of serially arranged storage elements which supply electric power to the assembled battery supervisory device 2A and the number m of serially arranged storage elements which do not supply electric power to the assembled battery supervisory device 2A are arbitrary and not particularly limited, but for example, in cases where lithium-ion batteries are used as the storage elements which constitute the assembled battery 1, by setting to three the number n of serially arranged storage elements which supply electric power to the assembled battery supervisory device 2A, the voltage to be inputted to the voltage conversion circuit 21A can be made to about 10 V, which becomes a preferable arrangement example.

Figure 2:
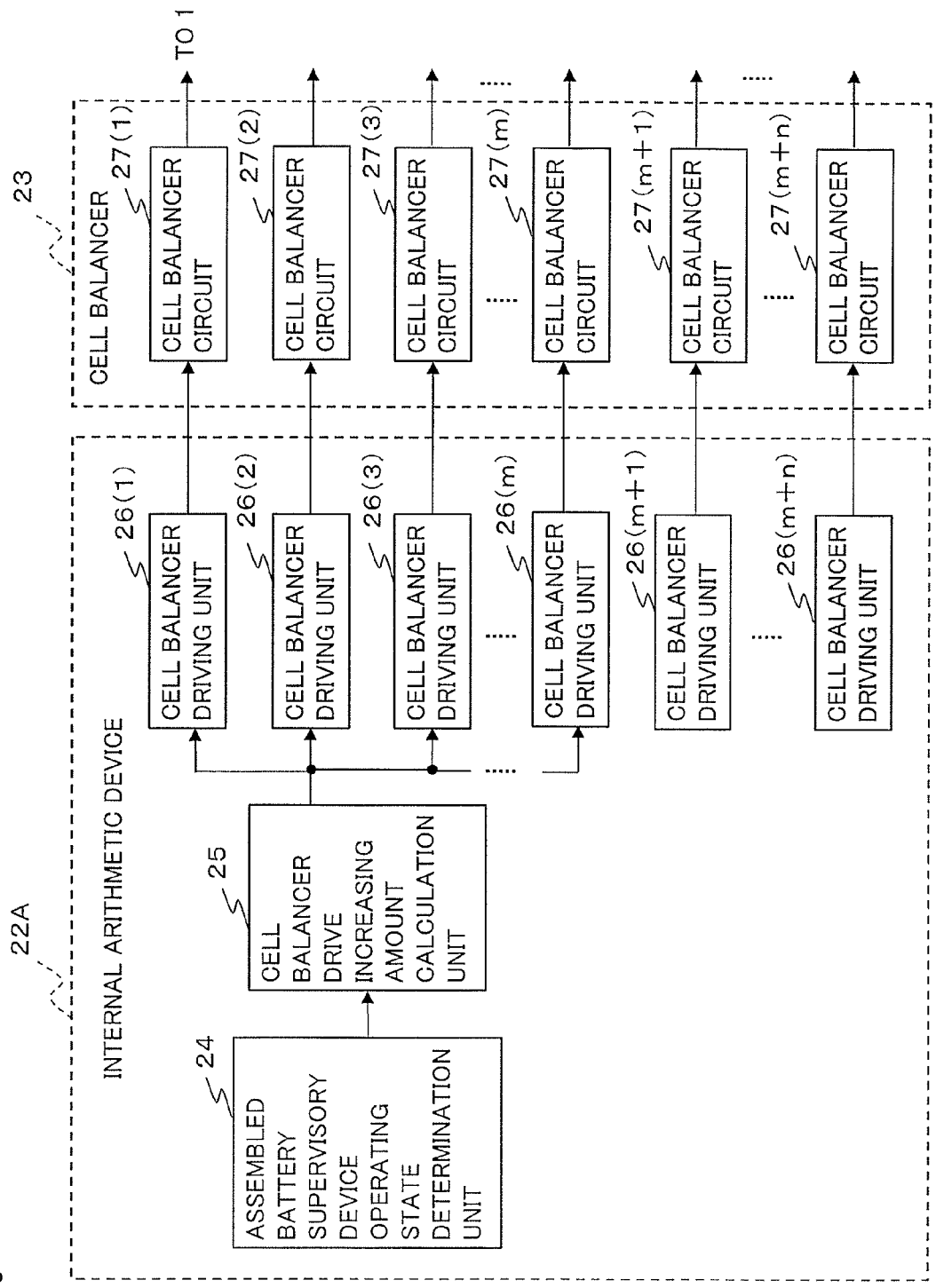
FIG. 2 is a block diagram showing a functional construction of an internal arithmetic device and a cell balancer in FIG. 1.

FIG. 2 is a block diagram showing a functional construction of the internal arithmetic device 22A and the cell balancer 23 in the assembled battery supervisory device 2A.

In FIG. 2, the internal arithmetic device 22A is provided with an assembled battery supervisory device operating state determination unit 24, a cell balancer drive increasing amount calculation unit 25, and a plurality of (m+n) cell balancer driving units 26(1)-26($m+n$).

In addition, the cell balancer 23 is provided with a plurality of (m+n) cell balancer circuits 27(1)-27($m+n$) which are individually driven and controlled by means of the cell balancer driving units 26(1)-26($m+n$).

The cell balancer circuits 27(1)-27($m+n$) correspond to the individual storage elements within the assembled battery 1, and the cell balancer circuits 27(1)-27($m$) correspond to those storage elements which do not supply electric power to the assembled battery supervisory device 2A, and the cell balancer circuits 27($m+1$)-27($m+n$) correspond to those storage elements which supply electric power to the assembled battery supervisory device 2A.

In the internal arithmetic device 22A, the assembled battery supervisory device operating state determination unit 24 and the cell balancer drive increasing amount calculation unit 25 together constitute a cell balancer driving control part that determines the average consumption electric current of the assembled battery supervisory device 2A, and controls the plurality of the cell balancer driving units.

The assembled battery supervisory device operating state determination unit 24 determines whether the assembled battery supervisory device 2A is in operation, and inputs an operating state (corresponding to the average consumption electric current) of the assembled battery supervisory device 2A to the cell balancer drive increasing amount calculation unit 25.

The cell balancer drive increasing amount calculation unit 25 calculates, as amounts of corrective driving for equalizing the states of charge of the individual storage elements, increased amounts of driving for partially increasing the amounts of driving of the cell balancer 23, respectively, and inputs them to the cell balancer driving units 26(1)-26($m$), respectively.

That is, in cases where the assembled battery supervisory device 2A is in operation, according to the result of the determination of the assembled battery supervisory device operating state determination unit 24, the cell balancer drive increasing amount calculation unit 25 calculates the increased amounts of driving of the cell balancer circuits 27(1)-27($m$) corresponding to those storage elements which do not supply electric power to the assembled battery supervisory device 2A, respectively, and increases the amounts of driving of the cell balancer driving units 26(1)-26($m$) corresponding to those storage elements which do not supply electric power to the assembled battery supervisory device, respectively.

Here, note that the increased amounts of driving are predetermined amounts which increase rates or proportions of the driving of a part of the cell balancer circuits within the cell balancer 23, respectively, and can be set in advance by measuring, through experiments, the average consumption electric current at the time of the operation of the assembled battery supervisory device 2A.

For example, in cases where the electric current of a storage element which supplies electric power to the assembled battery supervisory device 2A within the assembled battery 1 is consumed by Ia [A] by the operation of the assembled battery supervisory device 2A, and in cases where the variation in the storage element is eliminated by Ib [A] by means of the driving of the cell balancer 23, an increased amount of driving of the cell balancer 23 is set to (Ia/Ib)×100[%].

The cell balancer driving units 26(1)-26(m) increase the amounts of driving of the cell balancer circuits 27(1)-27(m) by the increased amounts of driving calculated by the cell balancer drive increasing amount calculation unit 25, respectively, thereby to drive the individual cell balancer circuits 27(1)-27(m), respectively.

On the other hand, the cell balancer driving units 26(m+1)-26(m+n) drive the cell balancer circuits 27(m+1)-27(m+n) by ordinary amounts of driving, respectively.

Here, note that the ordinary amounts of driving are set in such a manner that the cell balancer 23 is driven based on differences in voltage among the storage elements which constitute the assembled battery 1, at the time when the use of the assembled battery 1 is stopped, so as to make the voltages of the storage elements uniform.

For example, in cases where the assembled battery 1 is applied to a power supply system for a vehicle, the term "at the time when the use of the assembled battery 1 is stopped" means 'at the time when the vehicle is stopped".

Figure 3:
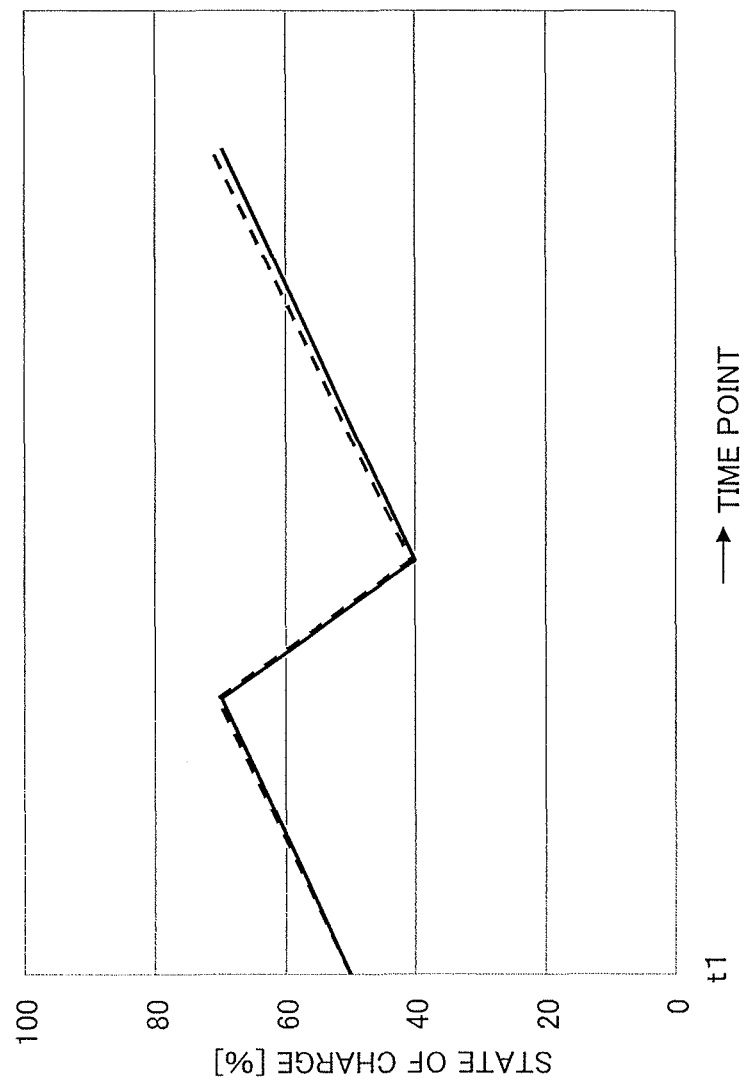
FIG. 3 is an explanatory view showing the states of charge of storage elements in the assembled battery according to the first embodiment of the present invention.

By the above-mentioned equalization processing of the internal arithmetic device 22A, the states of charge of the storage elements within the assembled battery 1 become, as shown in FIG. 3.

FIG. 3 is an explanatory view showing the states of charge of the storage elements in the assembled battery 1 based on the equalization processing of the internal arithmetic device 22A according to the first embodiment of the present invention.

In FIG. 3, similarly as stated above (refer to FIG. 11), a solid line indicates the change of the state of charge of each storage element which supplies electric power to the assembled battery supervisory device 2A in the assembled battery 1, whereas a broken line indicates the state of charge of each storage element in the assembled battery 1 which does not supply electric power to the assembled battery supervisory device 2A.

In the case of FIG. 3, it can be understood that after the time point t1 at which the operation of the power supply system using the assembled battery 1 is started, there is almost no deviation in the state of charge between the storage element (solid line) which supplies electric power to the assembled battery supervisory device 2A and the storage element (broken line) which does not supply electric power to the assembled battery supervisory device 2A, and hence, the deviation is clearly suppressed in comparison with FIG. 11.

As described above, the power supply system using an assembled battery according to the first embodiment (FIG. 1 through FIG. 3) of the present invention includes the assembled battery 1 that is composed of the plurality of storage elements combined in series with one another, and the assembled battery supervisory device 2A that supervises the state of charge of the assembled battery 1, wherein the assembled battery supervisory device 2A is provided with: the voltage conversion circuit 21A that requires an operating voltage lower than a voltage of the assembled battery 1, and is supplied with electric power from a part of the assembled battery 1; the cell balancer 23 that equalizes the states of charge of the plurality of storage elements; and the internal arithmetic device 22A that is supplied with electric power from the voltage conversion circuit 21A, and drives the cell balancer 23 in accordance with an average consumption electric current of the assembled battery supervisory device 2A.

That is, the assembled battery supervisory device 2A is supplied with electric power from a part of the assembled battery 1, and at the same time, the internal arithmetic device 22A in the assembled battery supervisory device 2A corrects the amounts of driving of the cell balancer 23 based on the average consumption electric current of the assembled battery supervisory device 2A, during the operation of the assembled battery supervisory device 2A, so as to suppress the deviation in the state of charge between those of the storage elements within the assembled battery 1 which supply electric power to the assembled battery supervisory device 2A, and those storage elements which do not supply electric power to the assembled battery supervisory device 2A, resulting from the average consumption electric current of the assembled battery supervisory device 2A.

According to this, it is possible to make the individual states of charge of the plurality of storage elements in the assembled battery 1 equal to one another in a reliable manner.

In addition, by supplying electric power to the assembled battery supervisory device 2A from a part of the assembled battery 1, an input voltage to the voltage conversion circuit 21A within the assembled battery supervisory device 2A can be adjusted to a voltage suitable for the operation of the voltage conversion circuit 21A, without depending on the number of the storage elements which are connected in series with one another within the assembled battery 1.

For example, even in cases where the number of the storage elements connected in series with one another within the assembled battery 1 is increased to raise the total voltage of the assembled battery 1, there is no need to use elements with high operation guarantee voltage for the voltage conversion circuit 21A which serves to supply electric power to the internal circuits of the assembled battery supervisory device 2A while performing voltage conversion thereof, as a result of which it is possible to suppress the enlargement and the cost rise of the system arrangement.

That is, it is not necessary to use elements with high operation guarantee voltage as the voltage conversion circuit 21A, thus making it possible to simplify the arrangement as well as to suppress the cost rise.

Moreover, in cases where the power supply system using the assembled battery of FIG. 1 is applied to a vehicle, it becomes possible to improve the accuracy of equalizing the states of charge of the storage elements during the operation of the vehicle, so that a period of time in which the cell balancer 23 is driven after the vehicle is stopped can be made short, thus making it possible to achieve a decrease in the electric power consumption.

Further, according to the first embodiment (FIG. 2) of the present invention, the cell balancer 23 is composed of the plurality of cell balancer circuits 27(1)-27(m+n) which correspond to the plurality of storage elements, respectively, and the internal arithmetic device 22A is provided with the plurality of cell balancer driving units 26(1)-26(m+n) corresponding to the plurality of cell balancer circuits 27(1)-27(m+n), respectively, and the cell balancer driving control part (the assembled battery supervisory device operating state determination unit 24 and the cell balancer drive increasing amount calculation unit 25) that determines the average consumption electric current of the assembled battery supervisory device 2A, and controls the plurality of cell balancer driving units.

The plurality of cell balancer driving units 26(1)-26(m+n) drive the cell balancer 23 in such a manner that the individual amounts of driving of the plurality of cell balancer circuits 27(1)-27(m+n) are changed to control the individual amounts of electric currents of the plurality of storage elements in a variable manner, thereby to equalize the states of charge of the individual storage elements, thus eliminating imbalance between those of the storage elements within the assembled battery 1 which supply electric power to the assembled battery supervisory device 2A and those storage elements which do not supply electric power to the assembled battery supervisory device 2A, during the operation of the assembled battery supervisory device 2A.

In this manner, by driving the cell balancer 23 so as to equalize the states of charge of the storage elements constituting the assembled battery 1 at the time of the operation of the assembled battery supervisory device 2A, it is possible to suppress the deviation in the states of charge among the individual storage elements resulting from supplying electric power for the assembled battery supervisory device 2A from a part of the assembled battery 1.

Accordingly, it is possible to suppress a decrease in the usable capacity of the assembled battery 1 resulting from the deviation in the states of charge of the individual storage elements, and at the same time to achieve an extension of the life span of the assembled battery 1.

In addition, according to the first embodiment (FIG. 2) of the present invention, the cell balancer driving control part is provided with the cell balancer drive increasing amount calculation unit 25 that calculates the increased amounts of driving based on the average consumption electric current during the operation of the assembled battery supervisory device 2A.

The plurality of cell balancer driving units 26(1)-26(m) increase the amounts of driving of the cell balancer circuits 27(1)-27(m) for the storage elements which do not supply electric power to the assembled battery supervisory device 2A, in accordance with the increased amounts of driving.

In this manner, by increasing the amounts of driving of the cell balancer circuits 27(1)-27(m) in accordance with the increased amounts of driving calculated based on the average consumption electric current of the assembled battery supervisory device 2A, it is possible to suppress the deviation in the states of charge of the individual storage elements resulting from supplying electric power to the assembled battery supervisory device 2A.

Accordingly, it is possible to suppress a decrease in the usable capacity of the assembled battery 1 resulting from the deviation in the states of charge of the storage elements, and at the same time to extend the life span of the assembled battery 1.

Moreover, because the equalization processing based on the average consumption electric current of the assembled battery supervisory device 2A, but not the equalization processing based on the individual voltages of the storage elements, is applied, there is no influence due to the variation in the internal resistances of the storage elements.

Further, in cases where the first embodiment of the present invention is applied to a power supply system for a vehicle, the accuracy of equalizing the states of charge of the storage elements during the operation of the vehicle can be improved, so that the period of time in which the cell balancer is driven after the vehicle is stopped can be made short, thus making it possible to achieve a decrease in the electric power consumption.

Second Embodiment

Here, note that in the above-mentioned first embodiment (FIG. 2), in the cell balancer drive increasing amount calculation unit 25, the amounts of driving of the cell balancer circuits 27(1)-27(m) for those storage elements which do not supply electric power to the assembled battery supervisory device 2A are increased by the predetermined amounts based on the average consumption electric current of the assembled battery supervisory device 2A (experimental result), respectively, without taking into consideration the drive time of the insulating communication circuit 30. However, it is desirable to obtain a corrected amount of operation in consideration of the drive time of the insulating communication circuit 30 and to correct the amounts of driving of the cell balancer 23, in a cell balancer drive increasing amount calculation unit 25B, as shown in FIG. 4.

The average consumption electric current of the assembled battery supervisory device 2A is actually affected by the influence of the drive time of the insulating communication circuit 30 within the assembled battery supervisory device 2A.

For example, in cases where a photo coupler is used as the insulating communication circuit 30, the longer the drive time of the insulating communication circuit 30 (i.e., the lighting time of the photo coupler), the larger becomes the average consumption electric current of the assembled battery supervisory device 2A. In addition, the lighting time of the photo coupler changes according to the content of communication in the insulating communication circuit 30, so the average consumption electric current of the assembled battery supervisory device 2A does not become uniform.

Figure 4:
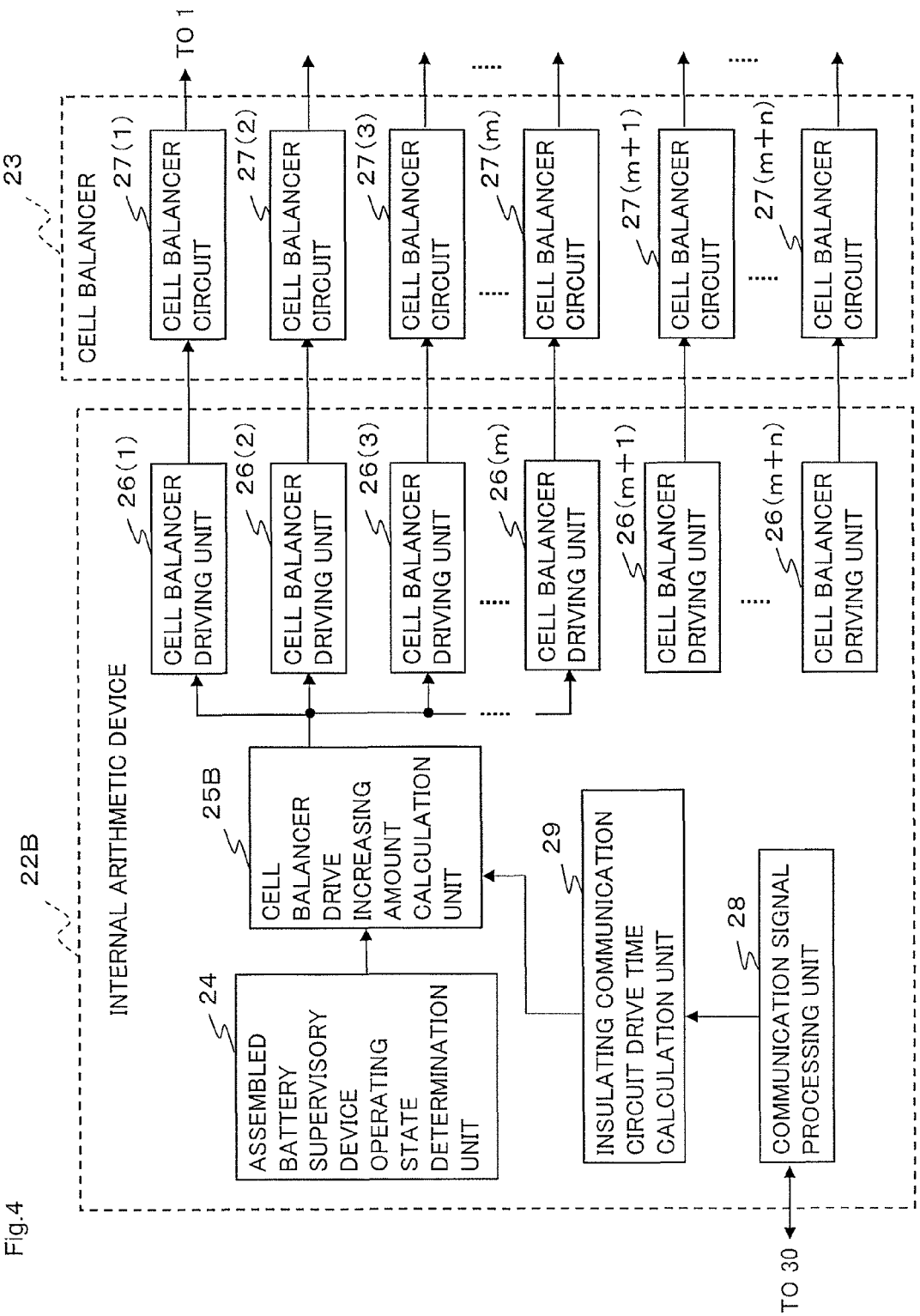
FIG. 4 is a block diagram showing a functional construction of an internal arithmetic device and a cell balancer according to a second embodiment of the present invention.

Accordingly, it is necessary to correct the increased amounts of driving of the cell balancer circuits 27(1)-27(m) according to the content of communication in the insulating communication circuit 30, as shown in FIG. 4.

FIG. 4 is a block diagram showing a functional construction of an internal arithmetic device 22B and the cell balancer 23 according to a second embodiment of the present invention, wherein those components which are similar to the above-mentioned ones (refer to FIG. 2) are denoted by the same reference numerals and characters as those in the above-mentioned embodiments, or with "B" being attached to reference numerals, and a detailed description thereof is omitted. Here, note that the overall construction or arrangement of the second embodiment of the present invention is as shown in FIG. 1.

In FIG. 4, the internal arithmetic device 22B is provided with a communication signal processing unit 28 that serves to process a signal transmission of the insulating communication circuit 30, and an insulating communication circuit drive time calculation unit 29 that is inserted between the communication signal processing unit 28 and the cell balancer drive increasing amount calculation unit 25B.

The insulating communication circuit drive time calculation unit 29 calculates the drive time (added-up amount) of the insulating communication circuit 30 based on the processing result (communication content) of the communication signal processing unit 28, and inputs a corrected amount of operation corresponding to the drive time to the cell balancer drive increasing amount calculation unit 25B.

Specifically, the insulating communication circuit drive time calculation unit 29 obtains the insulating communication circuit drive time by adding up periods of time in which the insulating communication circuit 30 (the photo coupler) is driven at high (Hi) level by a bit "1" (or driven at low (Lo) level by a bit "0") in communication data, as will be described late. Here, note that in the following description, the number of bits which are "1" in the communication data is referred to as the drive time.

The cell balancer drive increasing amount calculation unit 25B calculates, based on the corrected amount of operation inputted from the insulating communication circuit drive time calculation unit 29, the increased amounts of driving in consideration of not only the operation state of the assembled battery supervisory device 2A but also the corrected amount of operation, and corrects, through the cell balancer driving units 26(1)-26(m), the amounts of driving of the cell balancer circuits 27(1)-27(m) for those storage elements which do not supply electric power to the assembled battery supervisory device 2A.

In this case, the cell balancer drive increasing amount calculation unit 25B within the internal arithmetic device 22B is different from the above-mentioned one (FIG. 2) in that the amounts of driving of the cell balancer circuits 27(1)-27(m) for those storage elements which do not supply electric power to the assembled battery supervisory device 2A are corrected, respectively, by correcting the increased amounts of driving according to the communication content (the drive time).

Hereinafter, reference will be made to a specific operation according to the second embodiment of the present invention, while referring to FIG. 5 and FIG. 6 together with FIG. 1 and FIG. 4.

First, the communication signal processing unit 28 stores the content of a transmission signal by the insulating communication circuit 30 in a register (not shown) within the internal arithmetic device 22B.

Subsequently, the insulating communication circuit drive time calculation unit 29 calculates and adds up the drive time of the insulating communication circuit 30 based on the content of the transmission signal inputted from the communication signal processing unit 28, obtains, from the insulating communication circuit drive time, the corrected amount of operation of the cell balancer 23 for those storage elements which do not supply electric power to the assembled battery supervisory device 2A, and inputs the corrected amount of operation to the cell balancer drive increasing amount calculation unit 25B.

The cell balancer drive increasing amount calculation unit 25B inputs the increased amounts of driving, which have been corrected according to the corrected amount of operation of the cell balancer 23 inputted from the insulating communication circuit drive time calculation unit 29, to the cell balancer driving units 26(1)-26(m), respectively, corresponding to those storage elements which do not supply electric power to the assembled battery supervisory device 2A.

Figure 5:
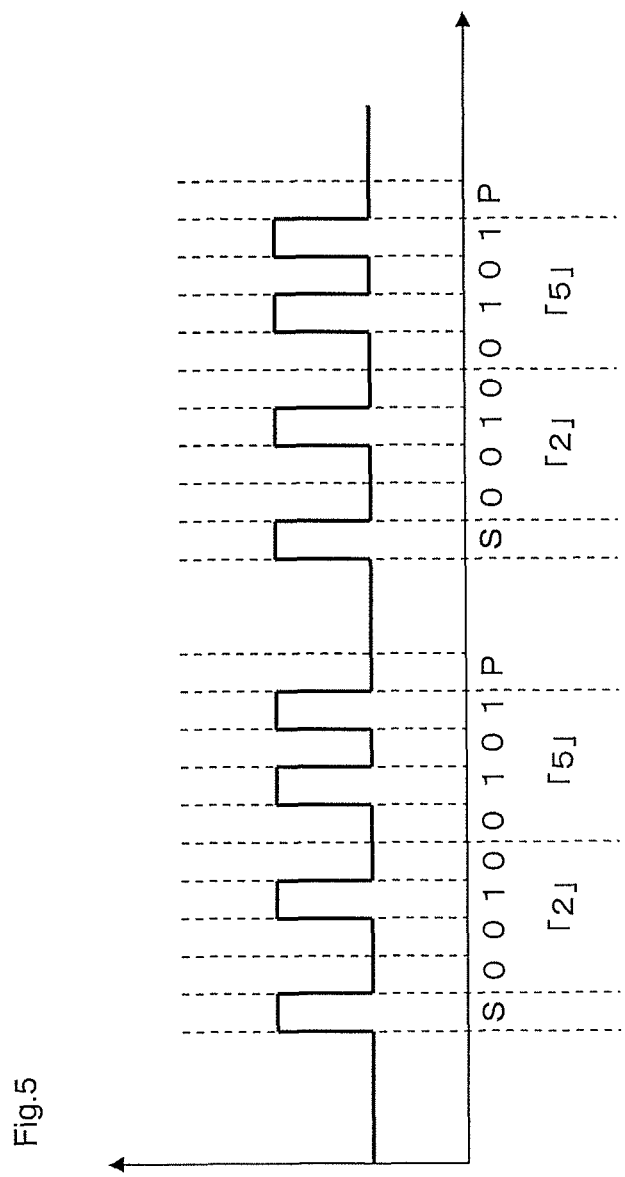
FIG. 5 is an explanatory view showing calculation processing of an insulating communication circuit drive time in a communication waveform according to the second embodiment of the present invention.

FIG. 5 is an explanatory view showing calculation processing of the insulating communication circuit drive time by means of the insulating communication circuit drive time calculation unit 29 in a communication waveform (rectangular wave), wherein there is shown a waveform example at the time when double-byte communication with a hexadecimal number of "2, 5, 2, 5" is carried out.

In FIG. 5, there is shown a case in which communication with an 8-bit binary number of "00100101" (2, 5) following a start bit S of "1" is carried out.

In this case, a specification of communication is defined as an odd parity, and because the number of "1" within a communication content "00100101" (8 bits) is three bits (odd number), and so its parity bit P becomes "0".

In FIG. 5, the communication period of time for "1" during communication with the hexadecimal number "2525" is calculated as a total of 8 bits including a start bit S "1", which is set as the insulating communication circuit drive time for 8 bits.

Figure 6:
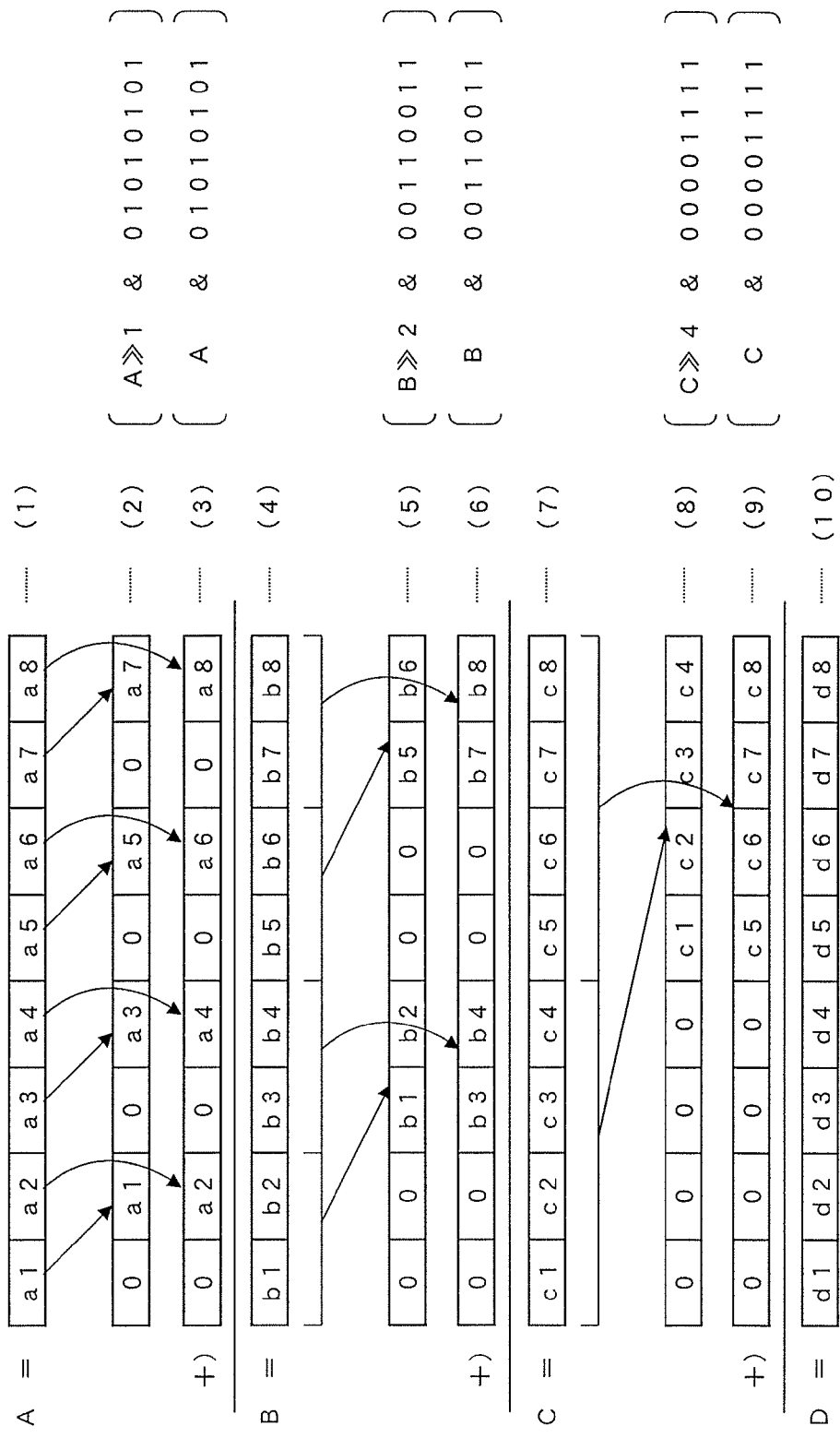
FIG. 6 is an explanatory view showing calculation processing of the insulating communication circuit drive time in an arithmetic expression according to the second embodiment of the present invention.

FIG. 6 is an explanatory view showing calculation processing of the insulating communication circuit drive time by means of the insulating communication circuit drive time calculation unit 29 in a mathematical expression, wherein there is shown a derivation process of the drive time (the number of bits which are "1" in data A) based on the data A of the communication content.

A specific reference will be made to a procedure for calculation of the number of bits with the value "1" from the communication content of the insulating communication circuit 30 according to the expression shown in FIG. 6.

In FIG. 6, data A, B, C, D of 8 bits, which are composed of expression (1), expression (4), expression (7) and expression (10), respectively, are constituted by bits a1-a8, bits b1-b8, bits c1-c8, and bits d1-d8, respectively.

In addition, in expression (2), expression (5) and expression (8), "X>>k" represents the processing of shifting data "X (=A, B, C)" by "k (=1, 2, 3)" bits to the right.

The data A (bits a1-a8) of the expression (1) is the value of the result of communication made.

The expression (2) is the result of shifting the data A by 1 bit to the right, and masking it by "01010101", and the expression (3) is the result of masking the data A by "01010101".

In the expression (4), the value obtained by the sum of the expression (2) and the expression (3) is assigned to the data B.

Individual two bits, "b1, b2", "b3, b4", "b5, b6", and "b7, b8", respectively grouped in the data B of the expression (4) represent the numbers of ones in sets of bits of a1 and a2, a3 and a4, a5 and a6, and a7 and a8, respectively.

The expression (5) is the result of shifting the data B by 2 bits to the right, and masking it by "00110011", and the expression (6) is the result of masking the data B by "00110011".

In the expression (7), the value obtained by the sum of the expression (5) and the expression (6) is assigned to the data C.

In the data C of the expression (7), one group of 4 bits "c1, c2, c3, c4" are the sum of "b1, b2" and "b3, b4", and represent the number of ones in a1-a4.

In addition, the other group of 4 bits "c5, c6, c7, c8" in the data C are the sum of "b5, b6" and "b7, b8", and represent the number of ones in a5-a8.

The expression (8) is the result of shifting the data C by 4 bits to the right, and masking it by "00001111", and the expression (9) is the result of masking the data C by "00001111".

In the expression (10), the value obtained by the sum of the expression (8) and the expression (9) is assigned to the data D.

In the data D of the expression (10), grouped 8 bits "d1, d2, d3, d4, d5, d6, d7, d8" are the sum of "c1, c2, c3, c4" and "c5, c6, c7, c8", and represent the number of ones in a1-a8.

As described above, it is possible to calculate the number of bits with the value "1" in the data A which is the result of communication with the insulating communication circuit 30.

Next, reference will be made to the procedure of processing of the insulating communication circuit drive time calculation unit 29 within the internal arithmetic device 22B, while referring to FIG. 7 and FIG. 8 together with FIG. 1 and FIG. 4.

Figure 7:
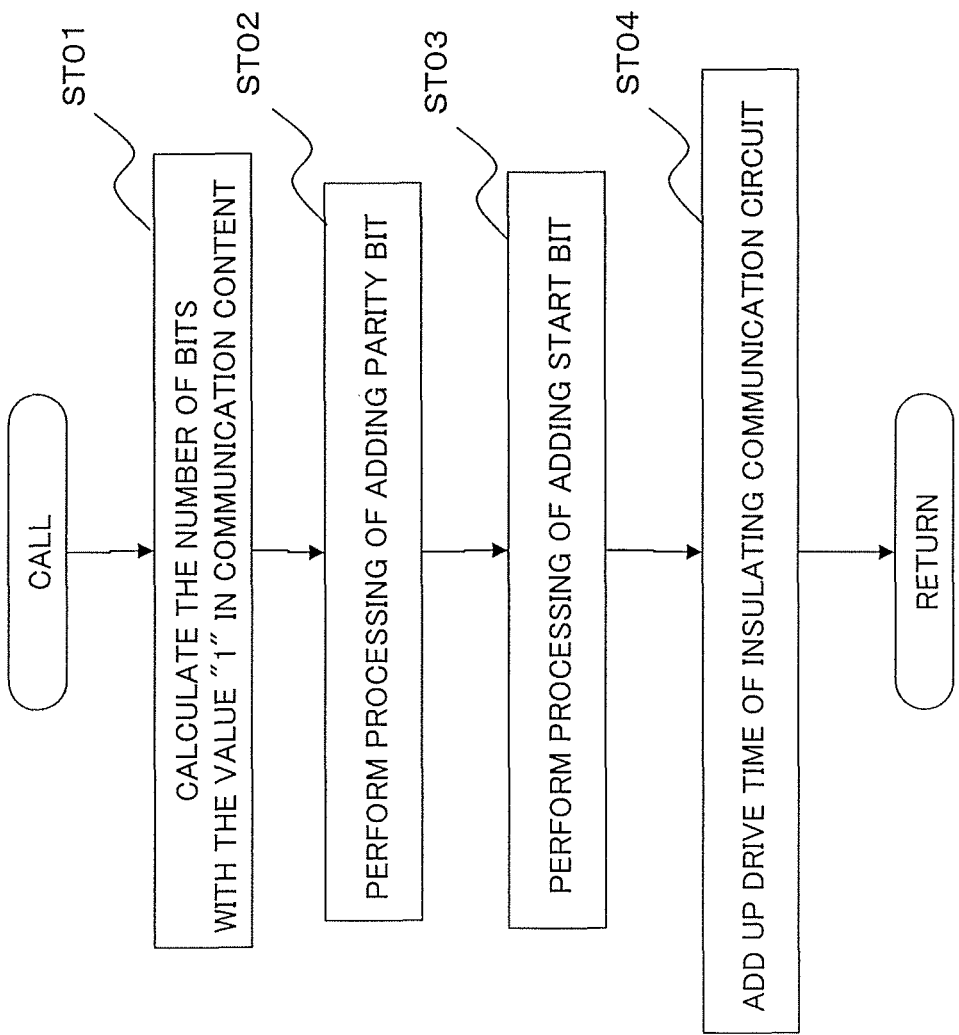
FIG. 7 is a flow chart showing calculation processing of the insulating communication circuit drive time according to the second embodiment of the present invention.
Figure 8:
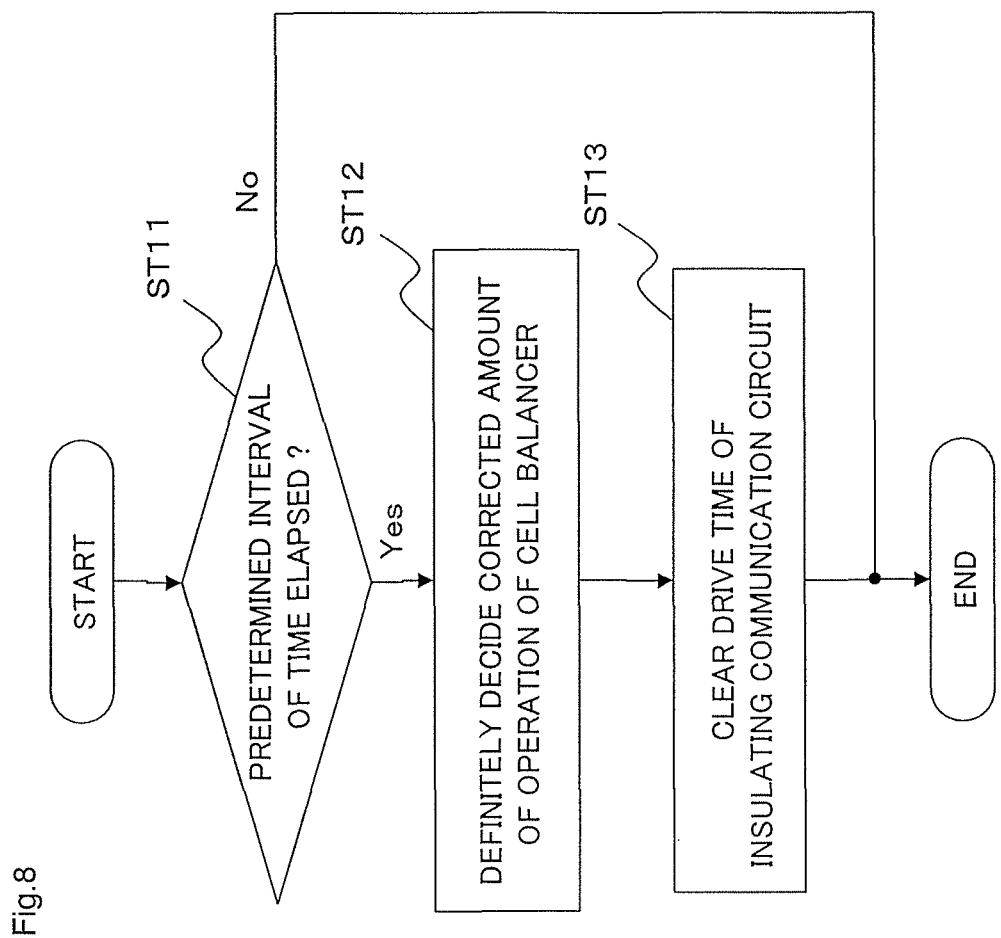
FIG. 8 is a flow chart showing calculation processing of a corrected amount of operation according to the second embodiment of the present invention.
Figure 9:
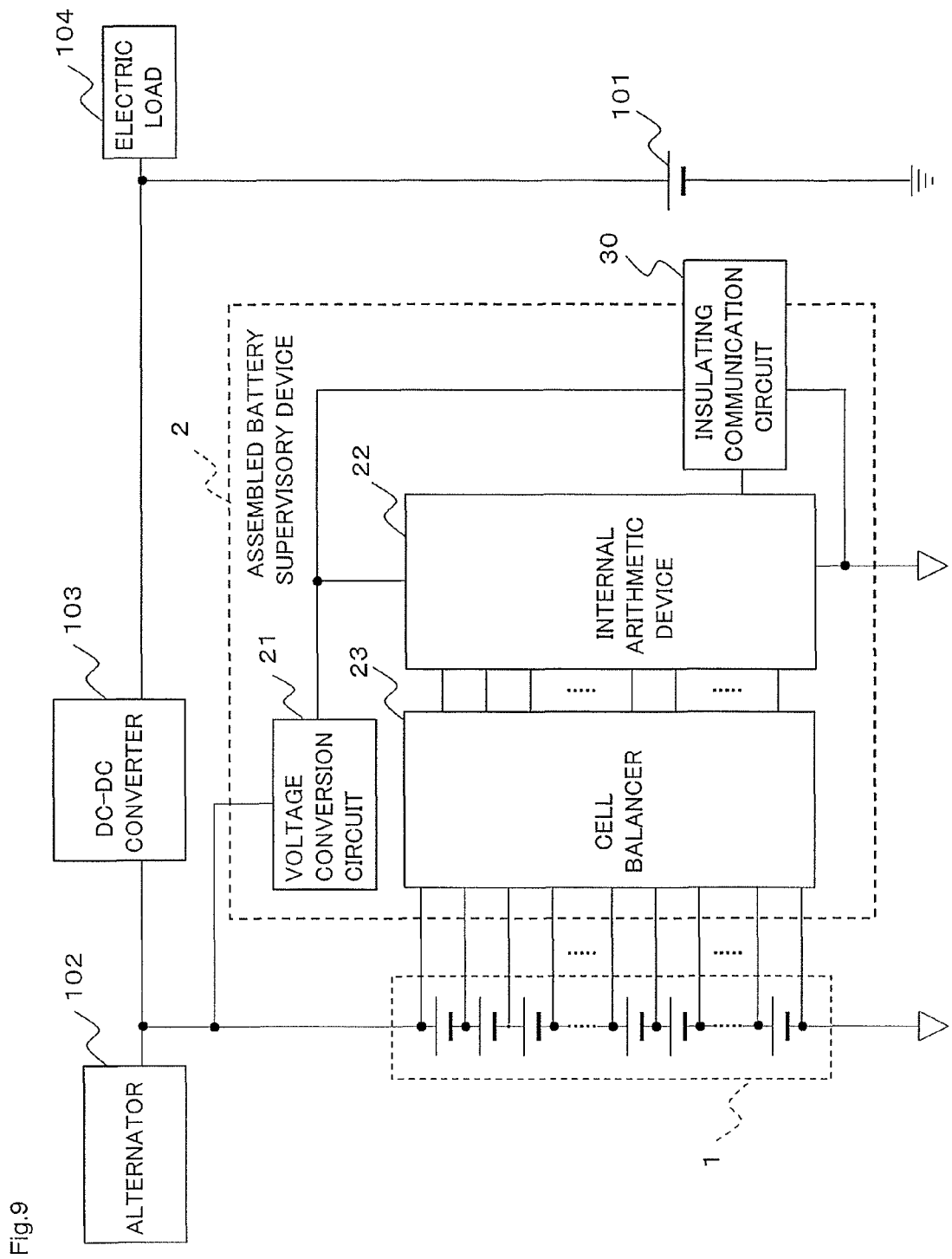
FIG. 9 is a block diagram showing an example of the arrangement of a conventional power supply system using an assembled battery.
Figure 10:
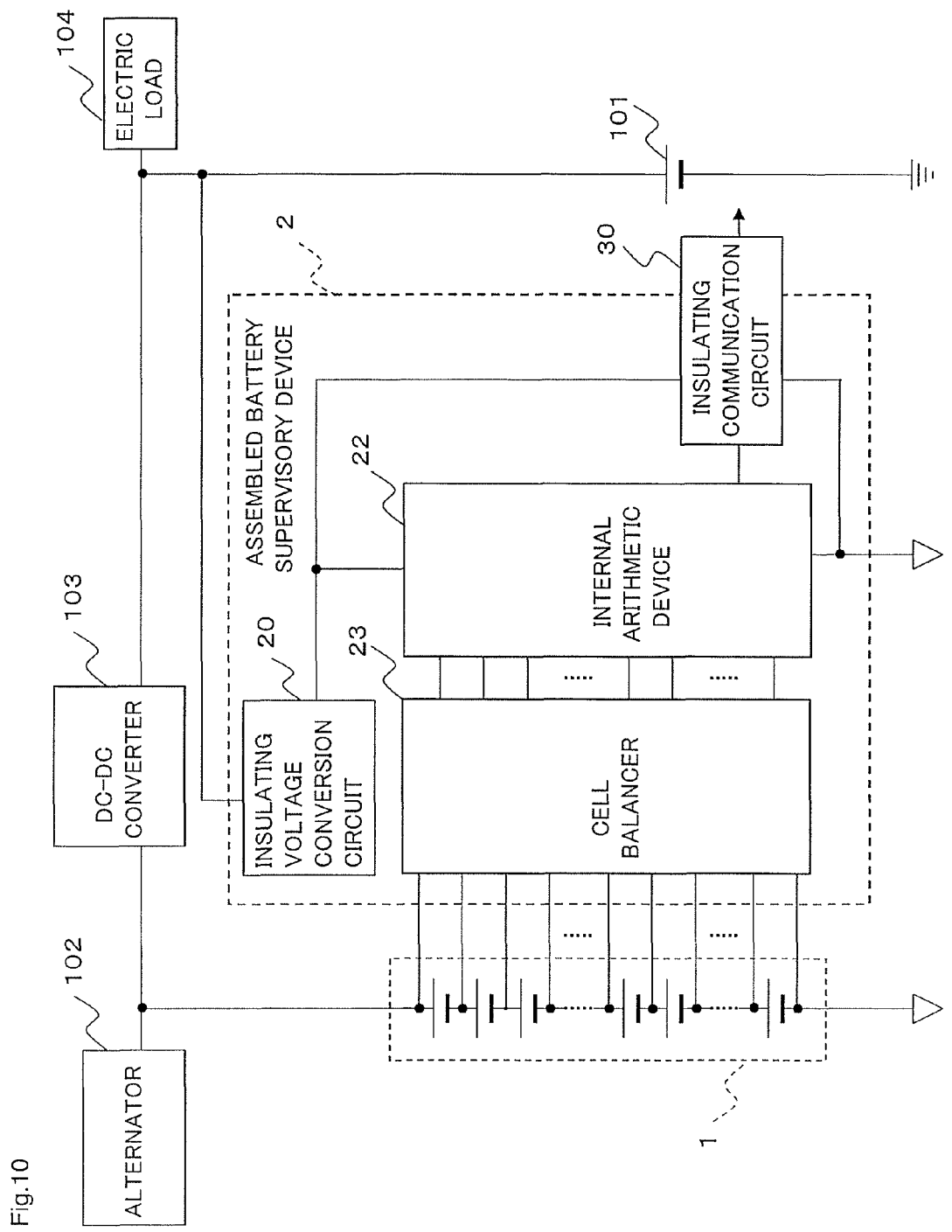
FIG. 10 is a block diagram showing another example of the arrangement of a conventional power supply system using an assembled battery.

FIG. 7 and FIG. 8 are flow charts showing the calculation processing of the corrected amount of operation in the cell balancer 23 according to the second embodiment of the present invention.

FIG. 7 is the flow chart showing the drive time calculation processing of the insulating communication circuit 30, wherein this flow or routine is called and executed by interruption at the time of the termination of communication in the insulating communication circuit 30.

Also, FIG. 8 is the flow chart showing the calculation processing of the corrected amount of operation, wherein this processing or routine is carried out at a fixed period (i.e., each time a predetermined interval of time TCYC elapses).

In FIG. 7, first, as shown in FIG. 6, the number of bits with the value "1" in the content of communication is calculated, as shown in FIG. 5 (step ST01), and subsequently, the processing of adding a parity bit P is carried out (step ST02).

In step ST02, in cases where the result of the calculation (the number of bits with the value "1") in step ST01 is even, the parity bit P is set to "1", and "1" is further added to the number of bits with the value "1".

On the other hand, in cases where the result of the calculation (the number of bits with the value "1") in step ST01 is odd, the parity bit P is set to In FIG. 5, the parity is handled as odd parity (P=1), and hence the parity bit is set to "1", but in the case of even parity (i.e., the number of bits with the value "1" in the communication content is an even number), the parity bit P is set to "0".

Then, subsequent to step ST02, the processing of adding the start bit S is carried out (step ST03).

In step ST03, "1" is further added, as the start bit S, to the number of bits with the value "1" in the set of bits of the communication content.

Finally, the drive time of the insulating communication circuit 30 is added up or integrated, and the number of bits with the value "1" in the content of communication is added to the drive time added-up (integrated) value thus obtained (step ST04), after which the current interrupt processing of FIG. 7 is ended, and a return is carried out.

In FIG. 8, first, it is determined whether the predetermined interval of time TCYC has elapsed (step ST11), and when a determination is made that the predetermined interval of time TCYC has not yet elapsed (that is, No), the current processing is immediately ended, and a return is carried out.

On the other hand, when a determination is made in step ST11 that the predetermined interval of time TCYC has elapsed (that is, Yes), a corrected amount of operation α of the cell balancer 23 is calculated and made definite, as shown in the following expression, by using an electric current IPC consumed by the storage elements at the time of driving the insulating communication circuit 30 for a unit time, an amount of electric current ICB which can equalize the amounts of charge of the storage elements at the time of driving the cell balancer 23 for a unit time, a time Tb taken for the insulating communication circuit 30 to send out 1 bit, the predetermined interval of time TCYC, and a drive time added-up (integrated) value n of the insulating communication circuit 30 (step ST12).

$$\alpha = (IPC/ICB) \times (Tbit/TCYC) \times n$$

Finally, the drive time added-up (integrated) value n of the insulating communication circuit 30 is cleared (step ST13), and the current processing of FIG. 8 is ended.

Hereinafter, the cell balancer drive increasing amount calculation unit 25B drives, through the cell balancer driving units 26(1)-26(m), the cell balancer circuits 27(1)-27(m) corresponding to the storage elements which do not supply electric power to the assembled battery supervisory, device 2A, by the increased amounts of driving which are added by the corrected amount of operation α of the insulating communication circuit 30, thereby achieving the equalization of the states of charge of the individual storage elements.

That is, the drive time of the insulating communication circuit 30 (the average consumption electric current of the assembled battery supervisory device 2A) changes depending on the content of communication between itself and other units, but by adding up the drive time of the insulating communication circuit 30 by means of the insulating communication circuit drive time calculation unit 29, and correcting the amounts of driving of the cell balancer 23 based on the thus added-up drive time of the insulating communication circuit 30, it is possible to suppress a deviation in the state of charge between those storage elements which supply electric power to the assembled battery supervisory device 2A and those storage elements which do not supply electric power to the assembled battery supervisory device 2A in an accurate manner thereby to equalize the individual storage elements, so that a decrease in the chargeable and dischargeable capacity of the assembled battery 1 can be suppressed.

As described above, the assembled battery supervisory device 2A according to the second embodiment (FIG. 4 through FIG. 8) of the present invention is provided with the insulating communication circuit 30 that serves to carry out communications with external units, and the cell balancer driving control part (the cell balancer drive increasing amount calculation unit 25B) is provided with the insulating communication circuit drive time calculation unit 29 that serves to obtain the insulating communication circuit drive time by adding up the time for which the insulating communication circuit 30 has been driven.

The cell balancer driving control part (the cell balancer drive increasing amount calculation unit 25B, the insulating communication circuit drive time calculation unit 29) corrects the increased amounts of driving based on the insulating communication circuit drive time, and the plurality of cell balancer driving units 26(1)-26(m) correct the increased amounts of driving based on the insulating communication circuit drive time thereby to drive the cell balancer 23 (the cell balancer circuits 27(1)-27(m)).

In this manner, by correcting, based on the drive time of the insulating communication circuit 30, the amounts of driving of the cell balancer 23 (cell balancer circuits 27(1)-27(m)) with respect to those storage elements which do not supply electric power to the assembled battery supervisory device 2A, it is possible to suppress the deviation in the states of charge of the individual storage elements resulting from a change in the content of communication (a change in the average consumption electric current of the assembled battery supervisory device 2A).

Accordingly, it is possible to suppress a decrease in the usable capacity of the assembled battery 1 resulting from the deviation in the states of charge of the individual storage elements, and at the same time to achieve an extension of the life span of the assembled battery 1.

In addition, in cases where the power supply system using an assembled battery according to the second embodiment of the present invention is applied to a power supply system for a vehicle, the accuracy of equalizing the states of charge of the storage elements during the operation of the vehicle can be improved, so that the period of time in which the cell balancer 23 is driven after the vehicle is stopped can be made short, thus making it possible to achieve a decrease in the electric power consumption.

While the invention has been described in terms of preferred embodiments, those skilled in the art will recognize that the invention can be practiced with modifications within the spirit and scope of the appended claims.

What is claimed is:

1. A power supply system using an assembled battery, the power supply system comprising:
   an assembled battery that is composed of a plurality of storage elements combined in series with one another; and
   an assembled battery supervisory device configured to supervise a state of charge of said assembled battery;
   wherein said assembled battery supervisory device comprises:

a voltage conversion circuit that requires an operating voltage lower than a voltage of said assembled battery, and is supplied with electric power from a part of said assembled battery;

a cell balancer configured to equalize the states of charge of said plurality of storage elements; and an internal arithmetic device configured to drive said cell balancer in accordance with an average electric current consumption of said assembled battery supervisory device; and wherein said arithmetic device is supplied with stabilized electric power from said voltage conversion circuit.

2. The power supply system using an assembled battery as set forth in claim 1, wherein said cell balancer is composed of a plurality of cell balancer circuits which correspond to said plurality of storage elements, respectively;

wherein said internal arithmetic device comprises:

a plurality of cell balancer driving units which correspond to said plurality of cell balancer circuits, respectively; and a cell balancer driving control part configured to determine the average electric current consumption of said assembled battery supervisory device, and to control said plurality of cell balancer driving units; and wherein said plurality of cell balancer driving units:

are configured to equalize the states of charge of said plurality of storage elements by changing the individual amounts of driving of said plurality of cell balancer circuits thereby to control the individual amounts of electric currents of said plurality of storage elements in a variable manner, and are further configured to drive said cell balancer based on the average electric current consumption of the assembled battery supervisory device so as to eliminate imbalance between those storage elements in said assembled battery which supply electric power to said assembled battery supervisory device, and those storage elements which do not supply electric power to the assembled battery supervisory device, during operation of said assembled battery supervisory device.

3. The power supply system using an assembled battery as set forth in claim 2, wherein said cell balancer driving control part includes a cell balancer drive increasing amount calculation unit configured to calculate increased amounts of driving based on the average electric current consumption during the operation of said assembled battery supervisory device; and wherein said plurality of cell balancer driving units are configured to increase the amounts of driving of the cell balancer circuits for those storage elements which do not supply electric power to said assembled battery supervisory device, in accordance with said increased amounts of driving.

4. The power supply system using an assembled battery as set forth in claim 2, wherein said assembled battery supervisory device is provided with an insulating communication circuit configured to carry out communications with an external unit;

wherein said cell balancer driving control part:

includes an insulating communication circuit drive time calculation unit configured to obtain the insulating communication circuit drive time by adding up time for which said insulating communication circuit has been driven; and is further configured to correct said increased amounts of driving based on said insulating communication circuit drive time; and wherein said plurality of cell balancer driving units are further configured to correct said increased amounts of driving based on said insulating communication circuit drive time, thereby driving said cell balancer.

5. The power supply system using an assembled battery as set forth in claim 3, wherein said assembled battery supervisory device is provided with an insulating communication circuit configured to carry out communications with an external unit;

wherein said cell balancer driving control part:

includes an insulating communication circuit drive time calculation unit configured to obtain the insulating communication circuit drive time by adding up time for which said insulating communication circuit has been driven; and is further configured to correct said increased amounts of driving based on said insulating communication circuit drive time; and wherein said plurality of cell balancer driving units are further configured to correct said increased amounts of driving based on said insulating communication circuit drive time, thereby driving said cell balancer.

* * * * *